United States Patent [19]

Lax et al.

[11] 3,870,895

[45] Mar. 11, 1975

[54] AUTOMOTIVE ANTI-THEFT DEVICE

[76] Inventors: Jacob Lax, 850 44th St., Brooklyn, N.Y. 11220; Sandor Goldner, 4308 10th Ave., Brooklyn, N.Y. 11219

[22] Filed: Oct. 9, 1973

[21] Appl. No.: 404,270

[52] U.S. Cl............................ 307/10 AT, 180/114
[51] Int. Cl............................................ H02g 3/00
[58] Field of Search.............. 307/10 AT; 250/568; 180/114; 70/242, 243

[56] References Cited
UNITED STATES PATENTS

| | | | |
|---|---|---|---|
| 3,358,481 | 12/1967 | Roszkowski | 307/10 AT |
| 3,383,513 | 5/1968 | Douglas | 250/210 X |
| 3,733,862 | 5/1973 | Killmeyer | 70/DIG. 051 |
| 3,750,430 | 8/1973 | Crisa | 70/243 X |

*Primary Examiner*—T. E. Lynch
*Assistant Examiner*—M. Ginsburg

[57] ABSTRACT

An automobile ignition system which includes a DC to AC current converter followed by a gas-line valve-switch including a relay for the valve switch, which relay is responsive to solely DC current, both wires of relay AC circuitry being separately grounded with one groundable lead including in series a relay switch activatable of a logic cell component emittable of a power signal to open the grounding switch when predetermined photoelectric cell light beams activate the logic cell upon turning-on the ignition system by insertion of a perforated key, additional switches switching-in regular battery power to maintain-open the grounding lead switch which concurrently switches-off power to the photoelectric cell, the logic cell, and an amplifier of low-voltage logic cell output signals, the AC relay-switch circuitry being encased within a steel tubing, there being a metal container and lockable lid encasing the gas-line valve switch and relay therefor, the relay circuitry, and the DC-to-AC converter, and the grounding switch.

8 Claims, 2 Drawing Figures

AUTOMOTIVE ANTI-THEFT DEVICE

The present invention relates to an auto or truck anti-theft accessory device to the standard ignition and gasline system.

BACKGROUND TO THE INVENTION

It is highly unlikely that the auto thief or truck thief of the sneak-thief variety would be either sufficiently well provided with tools and equipment and/or have sufficient time, or have sufficient intelligence, to first gain access to under the auto-hood, pry or tear open a metal lock-box, carefully peel-open a steel tubing to gain access to encased lead wires, to thereafter provide a new source of AC-current and to concurrently both locate a grounding wire among many possibilities and sever that ground wire, or alternatively to cut-out a segment of a gas line tubing and substitute a by-pass segment therefor. This is to say that in most such thefts, great speed and simplicity of getting the auto motor running is necessary in order for the sneak thief to be willing to take the risk of being caught during the act of theft. In achieving such increased difficulty for the sneak thief, prior to the present invention there have been suggested various mechanism which heretofore have required an excessive amount and/or cost of special equipment, major alteration(s) of existing systems, and/or have been less than fool-proof allowing simple avoidance of the anti-theft mechanism.

SUMMARY OF THE INVENTION DISCLOSURE

Broadly the invention includes a gasline valve-switch operated by an AC-responsive relay and circuitry therefor non-responsive to DC power, and including a DC-to-AC current converter connected between a power switch and the gasline valve-switch relay circuitry. In a preferred embodiment, the normally-closed valve-switch cannot be opened by AC current through the AC circuitry thereof until a normally-closed grounding switch breaks ground of at least one of the grounds of the two AC valve-switch relay circuitry leads both of which are normally grounded, such that even if power be provided of an AC variety to the relay, the valve switch nevertheless is not opened until the grounding switch becomes opened, and there is provided another switch separate from the standard ignition switch such that even if the ignition switch be turned-on the valve-switch remains closed thereby blocking flow of gasoline through the valve switch. It is also preferred that the ignition switch power and ignition circuitry leads be also broken by the grounding relay switch until the normally-closed grounding switch becomes opened by the other switch such that even if the ignition switch be successfully turned-on and even if the gasline valve-switch relay circuitry be furnished with AC power or even if the gasline valve switch be by-passed, the ignition system remains inoperative until grounded ignition is opened and power leads closed. In other preferred embodiments, the second switch is a combination of a photoelectric cell, a photoelectric-cell lightbeam-receiving logic cell device together with a coded key coordinated with the programmed logic cell, with the coded key being preferably the conventional switch key except additionally including pre-coded apertures therein for transmitting the light beams and/or blocking some of the light beams of the photoelectric cell which is preferably activated by the switch key. Also preferably the various powered devices associated with the accessory safety mechanism of the nature described above become deactivated promptly upon or subsequent to (as the case may be as desired and engineered) the activation of the grounding switch relay to thereby break the ground thereof, and this same grounding switch relay or other relay concurrently switching-in the conventional battery-power source to maintain the ground in an open (broken) state after the photoelectric cell, etc. become deactivated to conserve power. In a further preferred embodiment, the AC-circuitry between the DC-to-AC converter and the valve-switch relay is substantially totally enclosed within a metal casing-tubing, as well as this and other major components of the grounding mechanism also being enclosed within a metal container having a lockable access lid, further complicating access to the critical parts of the safety anti-theft device — such as the valve-switch and relay thereof and the grounding relay switch and circuitry thereof, and the like as shall be described in greater detail below in the detailed description.

THE FIGURES

DETAILED DESCRIPTION OF THE INVENTION

Figure 1:
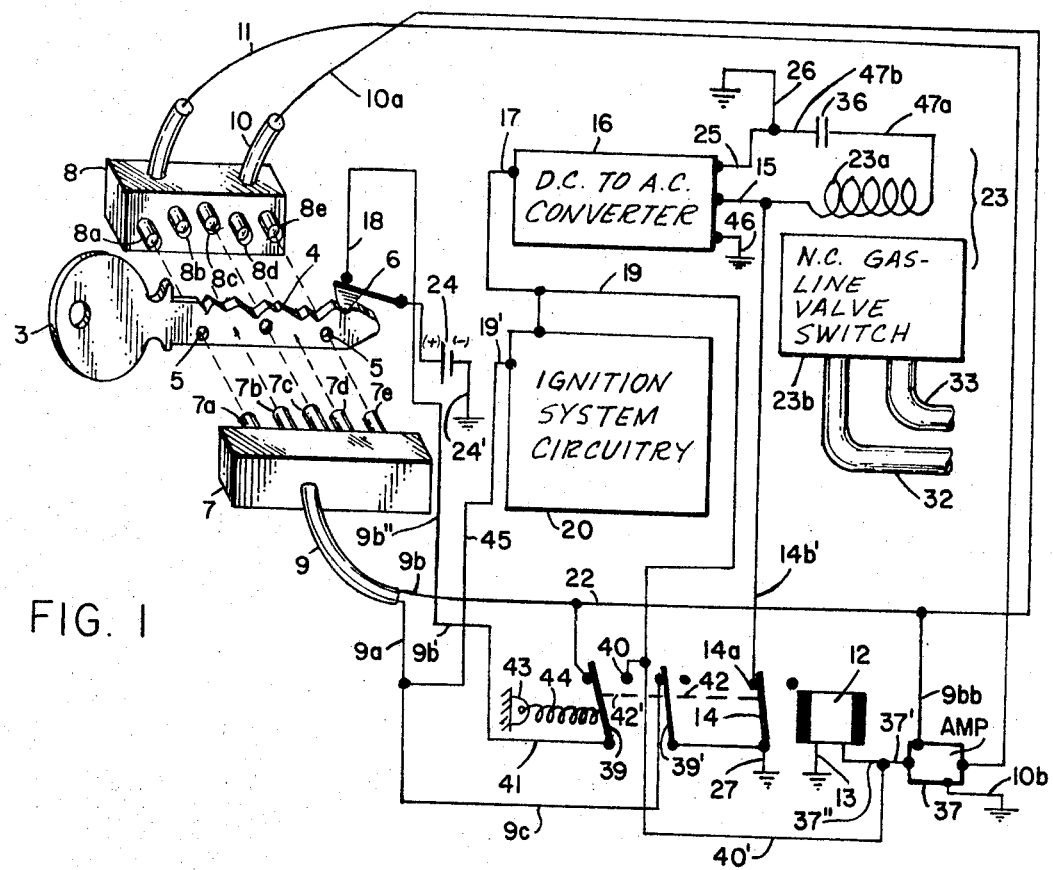
FIG. 1 illustrates graphically and in an in-part perspective view an overall ignition auto system having connected thereto the anti-theft device of a preferred embodiment in the nature of that described above.

In greater detail with particular reference to FIGS. 1 and 2, a preferred embodiment of the invention is disclosed as follows. An ignition switch key 3 having conventional preprogrammed teeth 4 along one edge thereof, and having preprogrammed apertures 5 through the key shaft below edge teeth 4. The teeth 4 when the switch key 3 is inserted into a conventional ignition switch, and turned to close switch 6 to provide power from the battery 24 to a switch positive output leads 18, 9b'', 9b' furnishing power to the power input cable 41 of switch 39 furnishing power to logic cell 8 and also to power-input leads 9b, 22, 9bb, and each of 10a and 10, and (when switched) to lead 19 to the DC-to-AC converter 16 and also to the ignition system circuitry.

The several light-beam producing cell elements 7a, 7b, 7c, 7d, and 7e typically produce each their respective light beam of which as preprogrammed coordinately with the logic cell 8 the light beams 7a, 7c, and 7e pass through the key 3 apertures 5 to stimulate logic cell 8 light-receptive and sensitive cell elements 8a, 8c, and 8e, while cell elements 8b and 8d remain in a signal output state for the logic cell 8 as a result of receiving no activation by light beams from cell elements 7b and 7d because of the opaque non-apertured portions of the key shaft; if an incorrect key were used which turned-on the switch 6 (closed it) but which either blocked light beams to 8a, 8c, and/or 8e and/or which permitted light beam(s) to stimulate 8b and/or 8d, no signal would be transmitted by the logic cell 8, of a conventional or other desired type of logic cell. Typically the logic cell 8 cell element 8a serves to either reduce resistance and/or to close circuit in order for a signal to be transmitted, while a circuit for cell element 8b remains either at high-resistance and/or when closed 8b is not activated, but when 8b receives light its resistance increases and/or circuit opens to block signal transmission of logic cell 8. When the proper programmed key 3 is inserted and/or turned in any conventional or desired manner in an ignition switch, the properly activated logic cell 8 causes a power signal to be transmitted by output lead 11 to an amplifier 37 powered by power lead 9bb and ground lead 10b, the amplifier output lead 37' providing power by input lead 37" to the relay 12 and to lead 13 to ground, the activated relay 12 serving to open switch 14 from contact 14a of ground lead 14b' which grounds AC lead 15, AC lead 26 being permanently grounded. The DC-to-AC converter 16 is powered by power leads 19 and 17, and has AC output leads 15 and 25, and including lead 47b to capacitor 36 and lead 47a between capacitor 36 and AC relay coil 23 a of AC valve relay switch 23 having the switch-valve 23b for opening and closing flow of gasoline between input conduit 32 and output conduit 33. As shown in FIG. 2, female hinge element 34 pivotably is hooked around key 35, for securing lid 34a together with the lock 34b with its key 34c. Flanges 30, 31 serve to secure various components in place within the metal container 29 having ports 29a and 29b and 29c. Leads 15 and 25 are encased within metal tubing 28, and lead 14b' within tubing 14b.

Figure 2:
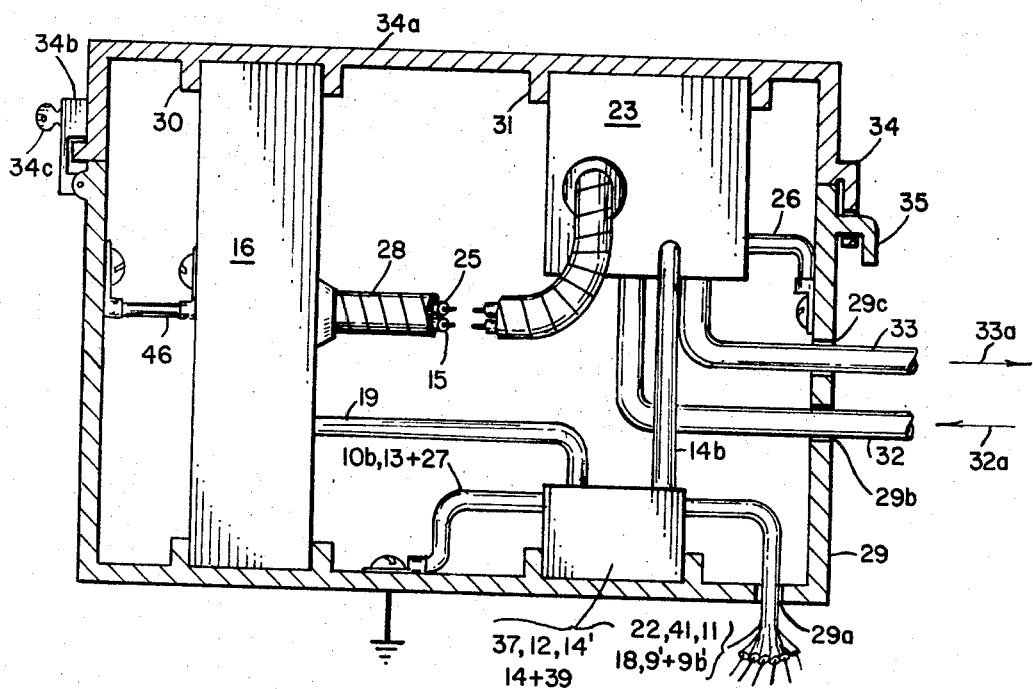
FIG. 2 illustrates a view typical of a cross-section in side view through a metal container having mounted therein various components of the FIG. 1 embodiment, and illustrating a typical lid and hinge and lock thereof for securing the encased components within the metal container.

With further reference to FIG. 1, switch 14 is a part of a gang switch mechanism including additionally gang levers 42 and 42' connected to switch levers 39' and 39 respectively.

When arm 14 is switched to an open state by relay 12 activation upon receipt of a signal from amplifier 37 by lead 37', concurrently lever 39 closes with contact 40 to thereby provide an alternate power in order that relay 12 will continue to holdopen lever 14 after gang relay switch 39 opens to terminate power through leads 9b' and 9b" to lead 9b to photoelectric cell 7 and concurrently opens the circuit of leads 9, 9a, and 9c, when the circuitry between leads 9c and 27 becomes opened by the gang relay switch 39'. Spring 44 is anchored to an anchored base structure 43 for returning lever 39, 39' and 14 to initial states including 14 to a closed grounding state when relay 12 becomes deactivated for lack of electrical power such as upon turning off the ignition switch by use of the switch key.

In the FIG. 1, lever 39' when open breaks the circuitry to leads 9a and 45, and 19' which lever 39' when closed serves as a return circuit switch for lead 9c as seen in FIG. 1. When gang switch 39 opens, power (or activation) is terminated for each of the logic cell and the photoelectric cell (8 and 7 respectively) simultaneously, and also for the amplifier lead 9bb and amplifier 37, converter 16 by way of leads 40' and 19, and circuitry 20, and with simultaneously the opening of the grounding lever 14 while reestablishing power by terminal 40 to lead 19. Grounding lead 45 of FIG. 1 grounds-out the ignition system circuitry power until grounding lever 39' opens to break that ground.

Obvious equivalents and variations of ordinary skill are within the scope of the present invention.

I claim:

1. An automotive anti-theft device comprising in combination ignition switch means (A) including (a) circuitry for an automotive ignition system and (b) a switch for opening and closing alternately the circuitry, and (B) defining a receptacle structure, receivable of a switch key of predetermined coded structure; a switch key means having said predetermined coded structure such that the switch key means is operatively insertable into the receptacle structure and will close and open the circuitry; a converter means for converting direct current to alternating current, having DC-input and output terminals and having AC-terminals, the DC-input and output terminals being operatively connected to said circuitry; a gas line relay valve-switch means mountable in series within an automotive gas-line and including an alternating-current switch-relay operatively responsive to solely alternating current, the alternating-current switch-relay being operatively connected between said AC-terminals; grounding-out means connected to said AC-terminals for separately grounding-out each of the AC-terminals, the grounding-out means including a grounding-out relay-switch with power circuitry connected to a relay thereof, the grounding-out relay-switch being adapted to alternately close and open grounding-out circuitry, in electrical series with at least one of the AC-terminals for making and breaking ground alternately of at least one of said AC-terminals; and said switch key means having further coded structure for turning alternately off and on relay-activating power to the relay of said grounding-out relay-switch.

2. An automotive anti-theft device of claim 1, in which the gas line relay-switch means further includes each of (a) alternating-current switch-relay-coil circuitry and (b) a capacitor element in series with said alternating-current switch-relay within said alternating-current switch-relay-coil circuitry connected between and to said AC-terminals.

3. An automotive anti-theft device of claim 2, in which said further structure of the switch key means includes: photoelectric cell means comprising a plurality of separate light-beam-producing cells; a photoelectric cell-light-receiving logic cell means having power signal output capacity and output terminal and programmed to initiate a power signal from said output terminal of the logic cell means upon receipt of predetermined combination of photoelectric cell light beams from said plurality of separate light-beam-producing cells; in which said grounding-out means and the grounding-out relay thereof is operatively connected in electrical series after said logic cell means output terminal; and in which said grounding-out means includes: power amplifier means connected in series between said grounding relay and said logic cell means output terminal; a power relay switch means and photoelectric-cell power circuitry thereof, said power relay switch means being connected to said further coded structure such that power to the photoelectric cell means may be turned on and off alternately by manual manipulation of said further coded structure; an alternate power circuit connected operatively for power input into said grounding relay switch; a first gang-switch gang-connected for concurrent operation to open and close a circuit within said alternate power circuit, such that when said grounding-out relay-switch becomes activated and accordingly breaks a grounding circuit, concurrently circuitry within said alternate power circuit becomes closed; and a second gang-switch in circuit-opening and circuit-closing series within said grounding-out means gang-connected for operation when and as said grounding-out relay-switch breaks a grounding circuit such that the second gang-switch opens concurrently with the opening of said grounding-out relay-switch and concurrently with the closing of the alternate power circuit.

4. An automotive anti-theft device of claim 3, wherein said power circuitry for said photoelectric cell means is operatively connected to provide electric power input into the photoelectric cell means and operatively connected to the further coded structure such that the electric power to the photoelectric cell means may be turned off and on alternately by control of said further coded structure; said alternate power circuit connected operatively for power input into said grounding-out relay; said power relay switch means being connected in series within said alternate power circuit such that the power relay switch means closes circuit when said grounding relay-switch breaks a grounding circuit concurrently, said second gang-connected switch connected operatively to a second power circuit powering said power amplifier means and said automotive ignition system circuitry and said converter means, to turn-off the second power circuit concurrently when said grounding-out means breaks a grounding circuit, the photoelectric cell means power circuitry including a cell ground lead.

5. An automotive anti-theft device of claim 4, including metal tubular casing, and valve-switch means circuitry operatively connected to and between said AC-terminals and said gasline relay valve-switch means, said valve-switch means circuitry being substantially fully-enclosed and encased within said tubular casing.

6. An automotive anti-theft device of claim 5, including a metal container and lid structures and lid locking means for locking the lid structure in a closed state on the container structure, defined port structure being in at least one of the container structure and the lid structure respectively for circuitry leads, each of said converter means and the gas-line relay valve-switch means and the capacitor element and the power amplifier means and the gang-switches and the tubular casing being mounted within said container structure enclosable therein by said lid structure.

7. An automotive anti-theft device of claim 3, in which said further coded structure includes apertures in said key such that said photo-electric cell-light-receiving logic cell means are both coordinately programmed to block some of the light beams from the plurality of cells and to transmit through said apertures other beams of light from the plurality of cells, and for the photo-electric cell-light-receiving logic means to be transmittible of said power signal only when some of the beams of light are blocked by the key structure and simultaneously when others of the beams of light are transmitted through said apertures of the key structure in accord with the programmed photo-electric cell-light-receiving logic means, said photo-electric cell-light-receiving logic means and said photoelectric cell means being mounted in conjunction with said ignition switch means operatively on opposite sides of the receptacle structure.

8. An automotive anti-theft device of claim 4, including an ignition system coil grounding-out lead connected between said cell ground lead and the ignition system circuitry.

* * * * *